June 30, 1936.　　　P. H. DOWLING　　　2,046,153
ELECTRICAL RECTIFIER
Filed Feb. 14, 1935
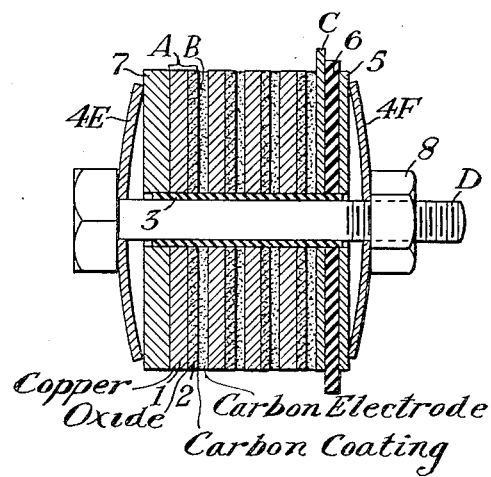
INVENTOR
Philip H. Dowling
BY
HIS ATTORNEY Patented June 30, 1936

2,046,153

UNITED STATES PATENT OFFICE 2,046,153

ELECTRICAL RECTIFIER

Philip H. Dowling, Forest Hills, Pa., assignor to The Union Switch & Signal Company, Swissvale, Pa., a corporation of Pennsylvania Application February 14, 1935, Serial No. 6,527

10 Claims. (Cl. 175—366)

My invention relates to electrical rectifiers, that is, to devices suitable for changing alternating currents into unidirectional currents. More specifically, my invention relates to an improvement in the well-known "copper oxide" rectifier which is described in Patent No. 1,640,-335, granted August 23, 1927, to Lars O. Grondahl.

I will describe one form of electrical rectifier embodying my invention, and will then point out the novel features thereof in claims.

The accompanying drawing is a vertical, longitudinal, sectional view showing one form of electrical rectifier embodying my invention.

Referring to the drawing, the rectifier comprises a plurality of asymmetric units each designated by the reference character A, and each comprising a plate 1 of a metal such as copper having a coating 2 of a compound of the metal formed thereon. For example, the coating 2 may be cuprous oxide. Asymmetric units of the type described exhibit the characteristics of offering a higher resistance to current which tends to flow from the copper to the oxide than to current which tends to flow in the opposite direction through the unit. A plurality of the asymmetric units A may be assembled on a suitable support, here shown as a bolt D which passes through suitable openings in the units, but which is separated from the units by a sleeve 3 of insulating material. Adjacent the coating 2 of cuprous oxide of each unit A is placed an electrode B of a non-fusible, non-oxidizable, non-ductile conducting material such, for example, as carbon. The units A are assembled on the bolt D in the manner shown in the drawing, that is, with the carbon electrode B interposed between and making electrical contact with the cuprous oxide coating of one unit and the copper of the next unit. I have found that contact between the cuprous oxide coating of the units A and the electrodes B may be improved, either by rubbing finely divided carbon into the outer surface of the cuprous oxide, or by painting such surface with a colloidal emulsion of carbon in water. Adjacent and in contact with the copper of the left-hand unit A is placed a washer 7 of a metal such as steel. Adjacent and in contact with the right-hand carbon electrode B is placed a terminal plate C made of any suitable conducting material, such as copper.

In order to bring the steel washer 7 and the copper terminal plate C in contact with the left-hand unit A and the right-hand carbon electrode B, respectively, and also to bring the plurality of units A and electrodes B in contact with each other, I have provided two steel spring washers 4E and 4F underneath the head of the bolt D and the nut 8, respectively, so that when the nut 8 is threaded on the bolt D, the whole is clamped tightly together. In order to insulate the nut 8 from the terminal plate C, I have provided an insulating washer 6, and in order to protect the washer 6 from damage by the spring washer 4F, I have interposed a flat steel washer 5 between the spring washer 4F and the insulating washer 6.

The assembled rectifier may be connected in an electrical circuit in any suitable manner, not shown in the drawing. For example, the conductors to the circuit may be attached to the terminal plate C and to the steel washer 7 which may be considered as the other terminal of the rectifier. In such a circuit the current will be comparatively free to flow from the terminal plate C to washer 7 but will be almost entirely prevented flowing from the washer 7 to the terminal plate C.

Although I have shown only one form of combination of rectifying units employing my invention, it is understood that other varieties of combinations of rectifying units may be made. Since such other combinations are well known to those skilled in the art, no detailed description is being made herein.

One object of my invention is to provide increased protection against the possibility of breakdown in the high resistance direction, that is, from the copper to the oxide. Another object of my invention is to provide greater protection against the possibility of an increase in resistance in the low resistance direction, that is, from the oxide to the copper. A still further purpose of my invention is to provide increased area of contact between the electrodes and the adjacent rectifying units.

Since carbon is not fusible, except at extremely high temperatures, there is little possibility of contact between the copper of a rectifying unit and its associated electrode of carbon even if the unit is subjected to voltage sufficiently high to puncture the oxide coating of such unit. Inasmuch as carbon does not oxidize at ordinary temperature, the carbon electrodes will maintain a substantially constant contact resistance over a long period of time. Furthermore, since carbon will not flow under pressure and the edges of the carbon electrodes are comparatively clean and free from shreds, the electrodes may be substantially the same size as the rectifying units, and there will be little probability of short circuiting the rectifier at the edge.

From the foregoing description it will be seen that I have provided an improvement in the construction of the well-known "copper oxide" rectifier which insures increased reliability and efficiency.

Although I have herein shown and described only one form of electrical rectifier embodying my invention, it is understood that various changes and modifications may be made therein within the scope of the appended claims without departing from the spirit and scope of my invention.

Having thus described my invention, what I claim is:

1. A rectifier comprising an asymmetric unit, a carbon coating in contact with said unit, and a carbon electrode in contact with said coating.

2. A rectifier comprising an asymmetric unit, a colloidal emulsion of carbon applied to said unit, and a carbon electrode in contact with said colloidal emulsion.

3. A rectifier comprising an asymmetric unit, finely divided carbon in contact with said unit, and a carbon electrode in contact with said finely divided carbon.

4. A rectifier comprising an asymmetric unit composed of copper and an oxide thereof, a carbon coating in contact with said oxide, and a carbon electrode in contact with said coating.

5. In combination, a metal having an electro-conductive compound of the metal formed thereon, said combination constituting in and of itself a unidirectional current carrying device, finely divided carbon applied to the free surface of said compound, and a carbon electrode pressed into intimate electrical contact with said compound.

6. In combination, a metal and an electro-conductive compound in intimate and permanent electrical contact with said metal, said combination constituting in and of itself a unidirectional current carrying device, a carbon coating applied to said compound, a carbon electrode in contact with said coating and means for pressing said electrode against said coating with considerable force.

7. In combination, a bolt, a plurality of units mounted thereon and each comprising the combination of a metal with a compound of the metal formed thereon, such combination constituting in and of itself a unidirectional current carrying device, finely divided carbon applied to the free surface of the compound in each unit, a carbon electrode in engagement with the free surface of the compound in each unit, and a nut for clamping said units together on said bolt.

8. In combination, a bolt, a plurality of units mounted thereon and each comprising the combination of copper with cuprous oxide formed thereon and integral therewith, such combination constituting in and of itself a unidirectional current carrying device, finely divided carbon applied to the free surface of the compound in each unit, a carbon electrode in engagement with the free surface of the compound in each unit, and a nut for clamping said units together on said bolt.

9. In a rectifying device, a copper plate having a layer of cuprous oxide integrally formed over substantially the entire surface of one side of said plate, said copper plate and oxide layer being utilized as a current valve permitting the flow of current in the direction from the oxide to the copper and preventing the current flow in the opposite direction, a carbon coating applied to substantially the entire surface of the side of the oxide opposite its junction with the copper, a carbon electrode in contact with said coating, and two terminals for connecting said device in a circuit, one such terminal in contact with the copper and the other terminal in contact with the carbon electrode.

10. A rectifier comprising a plurality of asymmetric units each having finely divided carbon applied thereto, a plurality of carbon electrodes connecting said units with each other, one terminal in contact with one of said units for connecting said rectifier to a circuit, and another terminal in contact with one of said electrodes for also connecting said rectifier to such circuit.

PHILIP H. DOWLING.